(12) United States Patent
Ross et al.

(10) Patent No.: US 8,396,773 B2
(45) Date of Patent: Mar. 12, 2013

(54) METHOD FOR STRUCTURING AN OBLIGATION

(75) Inventors: Ivan Ross, Scarsdale, NY (US); Emerson P. Jones, Greenwich, CT (US)

(73) Assignee: Goldman, Sachs & Co., New York, NY (US)

( * ) Notice: Subject to any disclaimer, the term of this patent is extended or adjusted under 35 U.S.C. 154(b) by 1314 days.

(21) Appl. No.: 10/288,050

(22) Filed: Nov. 5, 2002

(65) Prior Publication Data

US 2003/0163400 A1 Aug. 28, 2003

Related U.S. Application Data

(63) Continuation-in-part of application No. 09/896,425, filed on Jun. 29, 2001, now Pat. No. 7,222,094.

(51) Int. Cl.
*G06Q 40/00* (2012.01)
(52) U.S. Cl. ........................................ 705/36 R; 705/35
(58) Field of Classification Search .................... 705/26, 705/34, 35–38
See application file for complete search history.

(56) References Cited

U.S. PATENT DOCUMENTS

| 4,648,038 | A | * | 3/1987 | Roberts et al. | 705/36 R |
|---|---|---|---|---|---|
| 4,739,478 | A | * | 4/1988 | Roberts et al. | 705/36 R |
| 5,784,696 | A | * | 7/1998 | Melnikoff | 705/36 R |
| 6,021,397 | A | * | 2/2000 | Jones et al. | 705/36 R |
| 7,149,720 | B2 | * | 12/2006 | Shepherd | 705/37 |
| 7,340,427 | B1 | * | 3/2008 | Cornell | 705/37 |
| 7,340,433 | B1 | * | 3/2008 | Kay et al. | 705/38 |
| 2001/0042785 | A1 | * | 11/2001 | Walker et al. | 235/379 |
| 2004/0117302 | A1 | * | 6/2004 | Weichert et al. | 705/40 |

OTHER PUBLICATIONS

Nealon, Anne. "New focus for Caymen's Stock Exchange" International Financial Law Review 17. 12 (Dec. 1998): 52-54.*
Willoughby, Jack. "Muni-ficence". Institutional Investor, 33(1), (Jan. 1999): 73-73.*
Anonymous. "More trust-preferred CBOs teed up" Asset—Backed Alert (Jun. 18, 2001): 3-3.*

* cited by examiner

*Primary Examiner* — Hani M Kazimi
(74) *Attorney, Agent, or Firm* — Perkins Coie LLP

(57) ABSTRACT

A method for structuring an obligation. More particularly, a method for structuring an interest-bearing obligation which is convertible into stock.

12 Claims, No Drawings

METHOD FOR STRUCTURING AN OBLIGATION

CROSS-REFERENCE TO RELATED APPLICATIONS

This application claims the benefit under 35 U.S.C. 120 of U.S. application Ser. No. 09/896,425 filed Jun. 29, 2001 now U.S. Pat. No. 7,222,094.

FIELD OF THE INVENTION

The present invention relates to a method for structuring an obligation. More particularly, the present invention relates to a method for structuring an interest-bearing obligation which is convertible into stock.

BACKGROUND OF THE INVENTION

A number of financial mechanisms exist for paying interest to the purchaser of an obligation (including, but not limited to, a bond (such as a convertible bond, for example), a bond plus a warrant unit structure to buy stock, or a money market fund). For example, bonds and money market funds which pay fixed or variable rate interest may be purchased by the public from many sources. One conventional type of bond is a fixed income bond having an interest rate which is reset so that the bond pays on par (wherein the resetting of the interest rate is triggered by the value of the bond).

Likewise, a number of financial mechanisms exist which permit a holder to purchase stock at a future date. For example, "options contracts", which are typically sold to the public, give the holder of the contract the right to purchase a given stock at a fixed price at a future date. Similarly, "warrants", which are typically given or sold to employees of a company, give the holder the right to purchase stock in the employee's company at a fixed price at a future date.

Nevertheless, none of the existing financial mechanisms provide for an interest-bearing obligation in which the interest payable on the obligation is reset when the price of an underlying or tracked stock changes, as provided for by the present invention.

DETAILED DESCRIPTION OF THE INVENTION

As required, detailed embodiments of the present invention are disclosed herein; however, it is to be understood that the disclosed embodiments are merely illustrative of the invention that may be embodied in various forms. Therefore, specific structural and functional details disclosed herein are not to be interpreted as limiting, but merely as a basis for the claims and as a representative basis for teaching one skilled in the art to variously employ the present invention.

In one embodiment a method for conducting a transaction is provided, comprising: setting an initial yield for an obligation issued by an issuer, wherein the initial yield is applied to the obligation for an initial time period; setting a current yield for the obligation, wherein the current yield is applied to the obligation after the initial time period has elapsed, and wherein the current yield is set equal to one of a first reset yield and a second reset yield, depending upon a value of a share of a stock in relation to an accreted conversion price of the obligation; and permitting conversion of the obligation into the stock according to a conversion formula.

In another embodiment a method for conducting a transaction is provided, comprising: setting at least one of an issue price, a maturity date, and a nominal maturity value for an obligation issued by an issuer; setting an initial yield for the obligation, wherein the initial yield is applied to the obligation for an initial time period; setting a current yield for the obligation, wherein the current yield is applied to the obligation after the initial time period has elapsed, and wherein the current yield is set equal to one of a first reset yield and a second reset yield, depending upon a value of a share of a stock in relation to an accreted conversion price of the obligation; and permitting conversion of the obligation into the stock according to a conversion formula.

In another embodiment a method for conducting a transaction is provided, comprising: setting an initial yield for an obligation issued by an issuer, wherein the initial yield is applied to the obligation for an initial time period; setting a current yield for the obligation, wherein the current yield is applied to the obligation after the initial time period has elapsed, and wherein the current yield is set equal to one of a first reset yield and a second reset yield, depending upon a value of a share of a stock in relation to an accreted conversion price of the obligation; permitting conversion of the obligation into the stock according to a conversion formula; and permitting the issuer to redeem the obligation according to a redemption formula.

In another embodiment a method for conducting a transaction is provided, comprising: setting an initial yield for an obligation issued by an issuer, wherein the initial yield is applied to the obligation for an initial time period; setting a current yield for the obligation, wherein the current yield is applied to the obligation after the initial time period has elapsed, and wherein the current yield is set equal to one of a first reset yield and a second reset yield, depending upon a value of a share of a stock in relation to an accreted conversion price of the obligation; permitting conversion of the obligation into the stock according to a conversion formula; and permitting a holder of the obligation to require the issuer to re-purchase the obligation according to a re-purchase formula.

In another embodiment a method for conducting a transaction is provided, comprising: setting a current yield for an obligation issued by an issuer, wherein the current yield is applied to the obligation after an initial time period has elapsed, and wherein the current yield is set equal to one of a first reset yield and a second reset yield, depending upon a value of a share of a stock in relation to an accreted conversion price of the obligation; and permitting conversion of the obligation into the stock according to a conversion formula.

In another embodiment a method for conducting a transaction is provided, comprising: setting at least one of an issue price, a maturity date, and a nominal maturity value for an obligation issued by an issuer; setting an initial accretion rate for the obligation, wherein the initial accretion rate is applied to the obligation for an initial time period; setting a current accretion rate for the obligation, wherein the current accretion rate is applied to the obligation after the initial time period has elapsed, and wherein the current accretion rate is set equal to one of a first reset accretion rate and a second reset accretion rate, depending upon a value of a share of a stock in relation to an accreted conversion price of the obligation; permitting conversion of the obligation into the stock according to a conversion formula; permitting the issuer to redeem the obligation according to a redemption formula; and permitting a holder of the obligation to require the issuer to re-purchase the obligation according to a re-purchase formula.

In another embodiment a method for conducting a transaction is provided, comprising: setting a maturity date for an obligation issued by an issuer; setting an initial yield for the obligation, wherein the initial yield is applied to the obligation for an initial time period; setting a current yield for the obligation, wherein the current yield is applied to the obligation after the initial time period has elapsed, and wherein the current yield is set equal to one of a first reset yield and a second reset yield, depending upon a value of a share of a stock in relation to an accreted conversion price of the obligation; permitting conversion of the obligation into the stock according to a conversion formula; and permitting the issuer to truncate the maturity date.

In another embodiment a method for conducting a transaction is provided, comprising: setting a maturity date for an obligation issued by an issuer; setting an initial accretion rate for the obligation, wherein the initial accretion rate is applied to the obligation for an initial time period; setting a current accretion rate for the obligation, wherein the current accretion rate is applied to the obligation after the initial time period has elapsed, and wherein the current accretion rate is set equal to one of a first reset accretion rate and a second reset accretion rate, depending upon a value of a share of a stock in relation to an accreted conversion price of the obligation; permitting conversion of the obligation into the stock according to a conversion formula; permitting the issuer to redeem the obligation according to a redemption formula; permitting a holder of the obligation to require the issuer to re-purchase the obligation according to a re-purchase formula; and permitting the issuer to truncate the maturity date.

The current yield may be set equal to one of the first reset yield and the second reset yield depending upon the value of a share of the stock on a predetermined number of days in a test window in relation to an accreted conversion price of the obligation.

The current yield may be set equal to the first reset yield if the value of the share of stock is equal to or less than a predetermined percent of the accreted conversion price of the obligation on at least the predetermined number of days in the test window; and the current yield is set equal to the second reset yield if the value of the share of stock is not equal to or less than a predetermined percent of the accreted conversion price of the obligation on at least the predetermined number of days in the test window.

The predetermined percent of the accreted conversion price may equal 60 percent. The predetermined number of days may equal 20 days and the test window may equal 30 days. The predetermined number of days may equal 20 trading days and the test window may equal 30 trading days. The value of a share of stock may be a closing sales price of a share of stock.

The current yield may be set periodically using a period selected from the group including, but not limited to: a) by the split-second; b) by the second; c) by the minute; d) by the hour; e) daily; f) weekly; g) monthly; h) quarterly; i) semi-annually; and j) annually. The current yield may be set essentially continuously on a real-time basis.

The first reset yield may equal a rate that would result in a trading price of par of a hypothetical issue of a debt security of a reset rate target entity, wherein the terms of the hypothetical issue of the debt security may include: (i) a predetermined maturity (e.g., a predetermined number of days, weeks, months, or years); and (ii) an aggregate principal amount substantially equal to an accreted principal amount of the obligation. The hypothetical issue of the debt security may be a hypothetical issue of a senior, nonconvertible, non-contingent, fixed rate debt security. The predetermined maturity may equal a predetermined number of years between 1 and 20. The terms of the hypothetical issue of the debt security may further include other provisions that are, insofar as commercially practicable for an issue of a senior, nonconvertible, fixed-rate debt security, substantially identical to those of the obligation. Notwithstanding the trading price of par of the hypothetical issue of the debt security, the first reset yield may have at least one of an upper limit and a lower limit. The trading price of par of the hypothetical issue of the debt security may be determined by a third party. The reset rate target entity may be selected from the group including, but not limited to: a) the issuer; b) an entity having a legal relationship with the issuer; and c) an entity not having a legal relationship with the issuer.

Each of the initial time period, the initial yield, the first reset yield, and the second reset yield may equal a value selected from the group including, but not limited to: a) a value set by the time of issuance of the obligation; and b) a value set after the time of issuance of the obligation.

At least one of the initial time period, the initial yield, the first reset yield, and the second reset yield may have at least one of an upper limit and a lower limit.

At least one of the initial time period, the initial yield, the first reset yield, and the second reset yield may have a value which depends upon a sliding scale. The sliding scale may be set by the time of the issuance of the obligation. The sliding scale may change over time.

The second reset yield may equal the initial yield.

The method may further comprise setting at least one of an issue price and a nominal maturity value for the obligation.

The current accretion rate may be set equal to one of the first reset accretion rate and the second reset accretion rate depending upon the value of a share of the stock on a predetermined number of days in a test window in relation to an accreted conversion price of the obligation.

The current accretion rate may be set equal to the first reset accretion rate if the value of the share of stock is equal to or less than a predetermined percent of the accreted conversion price of the obligation on at least the predetermined number of days in the test window; and the current accretion rate may be set equal to the second reset accretion rate if the value of the share of stock is not equal to or less than a predetermined percent of the accreted conversion price of the obligation on at least the predetermined number of days in the test window.

The method may further comprise setting at least one of an issue price and a nominal maturity value for the obligation.

The stock may be stock in the issuer. The stock may be stock in an entity having a legal relationship with the issuer. The legal relationship may be selected from the group including, but not limited to: a) parent company; b) subsidiary; and c) holding company. The stock may be stock in an entity that is not legally related to the issuer. The stock may be in an entity whose stock is publicly traded.

The obligation may be sold to a holder by an underwriter. The obligation may be sold by the issuer to the underwriter for resale to the holder.

One embodiment of the present invention may be used in the context of a pure zero-coupon security (e.g., a bond), wherein the pure zero-coupon security may pay a yield based on the price of a tracked stock. For the purposes of the present application, the "yield" associated with the pure zero-coupon security may be an "accretion rate".

Another embodiment of the present invention may be used in the context of a security (e.g., a bond) that is not a pure zero-coupon security, wherein the security which is not a pure zero-coupon security may pay a yield based on the price of a tracked stock. For the purposes of the present application, the "yield" associated with the security that is not a pure zero-coupon security may be a "cash payment yield" or a combination of a "cash payment yield" and an "accretion rate".

For the purposes of this application, the "current" yield, accretion rate, or cash payment yield refers to a yield prevailing at a present or prospective time (as opposed to an historic yield).

In one specific example, the present invention provides for what will hereinafter be referred to as a Contingent Accretion Rate Convertible Zero-Coupon Security ("CARZ"). In one embodiment the CARZ may be a senior unsecured obligation (hereinafter sometimes referred to in the singular as "note" and in the plural as "notes") which is convertible into shares of stock (e.g., common stock). The note may have a predetermined issue price and a nominal maturity amount, wherein the nominal maturity amount may be subject to any upward adjustment in the event there is an interest adjustment. The nominal maturity amount may represent a predetermined annual initial accretion rate and such initial accretion rate may be in effect for a predetermined period of time after the issuance of the note. After the predetermined period of time has elapsed, there may be one ore more interest adjustments by which the accretion rate may be varied according to a formula described in detail below. Further, the note may be repurchased, redeemed, or converted into shares of stock under conditions described in detail below.

Of note, the obligation may have one or more "put" dates (i.e., dates at which a holder of the obligation may "put", or sell, the obligation). In addition, the interest adjustment for the obligation may occur on a put date for the obligation or a non-put date (i.e., any, other desired date). Further, the value of the adjusted interest may be dependent upon the price of a stock and/or the price of a stock in combination with the price of the obligation. For example, the value of the adjusted interest may be dependent upon: i) the price of the stock; or ii) the price of the stock in combination with the price of the obligation (wherein the price of the stock and/or the price of the obligation may be weighted relative to one another); or iii) a ratio of the price of the stock to the price of the obligation (wherein the price of the stock and/or the price of the obligation may be weighted relative to one another); or iv) a ratio of the price of the obligation to the price of the stock (wherein the price of the stock and/or the price of the obligation may be weighted relative to one another). Further still, the interest may be reset to a market rate (which may be actual or calculated) for debt having a maturity which may correspond to one or more put dates of the obligation. Accordingly, by operating as described, the present invention may provide a disincentive for a holder of the obligation to exercise a put.

Further, the adjusted interest rate may have high value and/or low value caps. Further still, there may be multiple adjusted interest rates for multiple stock price thresholds (wherein the adjusted interest rate may move up and/or down). Further still, there may be a formula or "sliding scale" for setting (e.g., up or down) the adjusted interest rate (e.g., one or both of the first reset accretion rate and the second reset accretion rate) for one or more stock price thresholds (such a "sliding scale" may comprise setting the adjusted interest rate to one or more values depending upon the stock price and the sliding scale may be fixed at the time of the issuance of the obligation and/or the sliding scale may be fixed after the issuance of the obligation and/or the sliding scale may vary over time). Further still, a sliding scale may be used to set the one or more of the initial accretion rate and the initial time period to one or more values (which may depend upon the stock price) and again the sliding scale may be fixed at the time of the issuance of the obligation and/or the sliding scale may be fixed after the issuance of the obligation and/or the sliding scale may vary over time). Further still one or more of the conversion formula, the redemption formula, and/or the re-purchase formula may operate on a sliding scale (which may depend upon the stock price) and again the sliding scale may be fixed at the time of the issuance of the obligation and/or the sliding scale may be fixed after the issuance of the obligation and/or the sliding scale may vary over time). Further, any of the above-mentioned variables which are based on a sliding scale or formula may move up and/or down over time (e.g., if the price of the stock goes down the yield may go up based on a formula and if the price of the stock later goes up the yield may go down based on the formula (of course, the reverse may also occur and each may occur multiple times)). Further still, the sliding scale or formula may be proportional to the stock price (e.g., directly proportional or linearly related), not proportional to the stock price (e.g., non-linearly related), and or weighted based on an increase or decrease in stock price (e.g., weighted based upon an actual increase or decrease in stock price or weighted based upon a percentage increase or decrease in stock price).

Details of a specific embodiment of the CARZ structure will now be described. It is noted that the details of this embodiment (hereinafter the "general embodiment") are provided for illustration only, and are not intended to be restrictive. For example, the present invention may, of course, also be used in the context of a security which is not a zero-coupon security, or which has attributes of both a zero-coupon security and a non-zero-coupon security. Further, while specific offering details regarding the CARZ terms are disclosed with reference to the general embodiment (e.g., issue price, nominal maturity amount, maturity date, nominal yield, redemption dates and terms, conversion dates and terms, repurchase dates and terms, interest adjustment dates and terms, etc.), it is to be understood that the present invention contemplates use of the CARZ structure with any other desired terms (e.g., a different issue price, a different maturity date, a different nominal maturity amount, a different nominal yield, different redemption dates and/or terms, different conversion dates and/or terms, different repurchase dates and/or terms, different interest adjustment dates and/or terms, etc.).

General Example of the CARZ Structure

An Issuer may issue the notes for resale by one or more initial purchasers (or "underwriters") to note holders (e.g., qualified institutional buyers). The notes may be issued under an Indenture (including an original indenture and any supplemental indentures) among the Issuer, a Support Company, and a Trustee. The Indenture may provide for the issuance from time to time of debt securities in an unlimited dollar amount and an unlimited number of series. Support Company may agree to make any payments required under the notes if Issuer defaults with respect to those payments The notes may be unsecured obligations of Issuer and may be limited to an aggregate principal amount at maturity of approximately $5.4 billion (approximately $6.3 billion principal amount at maturity if the initial purchasers exercise in full any option to purchase additional notes), subject to an upward adjustment in the event there is an increased accretion rate. The notes may mature on May 15, 2021. The notes may rank equally with all of Issuer's other unsecured and unsubordinated indebtedness.

Issuer may issue the notes at a price to holders of approximately $551 per note. Issuer may not necessarily pay cash interest on the notes unless an increased accretion rate is in effect of if Issuer elects to do so following a tax event. The maturity value of each note may exceed the nominal value of $1000 in the event that there is an increased accretion rate. The issue price may represent a yield to maturity of 3% per annum (which may be computed on a semi-annual bond equivalent basis) unless the notes become subject to an increased accretion rate. The notes may be issued in denominations of $1000 principal amount at maturity (and/or multiples of $1000 principal amount at maturity).

A holder may have the option to convert the holder's notes into common stock of Support Company, which may have a par value of $0.10 per share, at a conversion rate which may be 7.9318 shares of common stock of Support Company per note. This may be equivalent to an initial conversion price of $69.50 per share of common stock of Support Company based on the price to the holders of the notes. The conversion rate may be subject to adjustments if certain events occur. Upon conversion, the holder may receive only the common stock of Support Company. If all conditions are met such that the notes may be converted by the holders, then Support Company may include the potential dilutive effect of the shares of the common stock of Support Company issueable on conversion in its diluted earnings per share calculations during the periods those conversion conditions are met.

Each holder may agree, for U.S. federal income tax purposes, to treat the notes as "contingent payment debt instruments" and to be bound by Issuer's application of the Treasury regulations that govern contingent payment debt instruments, including Issuer's determination that the rate at which interest may be deemed to accrue for federal income tax purposes may be 7.51%, compounded semi-annually, which may be the rate comparable to the rate at which Issuer may borrow on a noncontingent, nonconvertable borrowing with terms and conditions otherwise comparable to the notes (including the rank, term, and general market conditions). Accordingly, each holder may be required to accrue interest on a constant yield to maturity basis at that rate, with the result that a holder may recognize taxable income significantly in excess of cash received while the notes are outstanding. In addition, a holder may recognize ordinary income upon a conversion of a note into the common stock of Support Company equal to the excess, if any, between the value of the stock received on the conversion and the holder's adjusted tax basis in the note. It is noted, however, that the application of the regulations that govern contingent payment debt instruments to a holder of a note may be otherwise construed or interpreted by the Internal Revenue Service and it might be determined that, among other differences, a holder should have accrued interest income at a lower rate, should not have recognized income or gain upon the conversion, or should not have recognized ordinary income upon a taxable disposition of a note.

Ranking of the Notes According to the General Embodiment

The notes may represent unsecured and unsubordinated obligations of Issuer and may rank equally with Issuer's other unsecured and unsubordinated debt. Further, the obligations under the Support Agreement may represent unsecured and unsubordinated obligations of Support Company and may rank equally with all of Support Company's other unsecured and unsubordinated debt.

Interest Adjustment According to the General Embodiment

For the purposes of this application, a "test window" shall mean a desired number of days over which a test or comparison is performed. Beginning on May 15, 2004, if the closing sales price of the common stock of Support Company is equal to or less than 60% of the Accreted Conversion Price of the notes for any x number of trading days (e.g., 20 trading days) out of the last y number of consecutive trading days (e.g., 30 trading days) ending three business days prior to such date or three business days prior to any May 15 or November 15 thereafter, then the accretion rate on the notes for the semiannual period commencing on such date may be subject to an increased accretion rate equal to the applicable per annum Reset Rate in effect at that time. Any increased accretion rate made pursuant to the preceding sentence may remain in effect until the May 15 or November 15 thereafter when the closing sales price of the common stock of Support Company is not equal to or less than 60% of the Accreted Conversion Price of the notes for any 20 trading days out of the last 30 consecutive trading days ending three business days prior to such date, at which time the accretion rate may revert to the initial rate of 3%. The "Reset Rate" may be established by the Reset Rate Agent as of each Reset Rate Determination Date. The "Reset Rate Determination Date" may be the date three business days preceding each of:

- May 15, 2004, in which case the Reset Rate will be the Two-Year Reset Rate;
- May 15, 2006, in which case the Reset Rate will be the Five-Year Reset Rate;
- May 15, 2008, in which case the Reset Rate will be the Two-Year Reset Rate;
- Nov. 15, 2009, in which case the Reset Rate will be the One-Year Reset Rate;
- May 15, 2011, in which case the Reset Rate will be the Five-Year Reset Rate;
- May 15, 2013, in which case the Reset Rate will be the Two-Year Reset Rate;
- Nov. 15, 2014, in which case the Reset Rate will be the One-Year Reset Rate;
- May 15, 2016, in which case the Reset Rate will be the Five-Year Reset Rate;
- May 15, 2018, in which case the Reset Rate will be the Two-Year Reset Rate; and
- Nov. 15, 2019, in which case the Reset Rate will be the One-Year Reset Rate.

The Reset Rate determined as of each Reset Rate Determination Date may be equal to the rate that would, in the sole judgment of the Reset Rate Agent, result in a trading price of par of a hypothetical issue of senior, nonconvertible, noncontingent, fixed rate debt securities of a "reset rate target entity" (including, but not limited to, one of the Issuer, the Support Company, and/or any other desired entity) with (i) a final maturity equal to, in the case of the Five-Year Reset Rate, five years; in the case of the Two-Year Reset Rate, two years; and in the case of the One-Year Reset Rate, one year; (ii) an aggregate principal amount equal to the accreted principal amount of the notes; and (iii) covenants and other provisions that are, insofar as would be practicable for an issue of senior, nonconvertible, fixed-rate debt securities, substantially identical to those of the notes. In no case, however, will the Reset Rate ever be greater than an upper bound (e.g.11%) or less than a lower bond (e.g. 3%). Also, if the Reset Rate Agent has not established the Reset Rate for the applicable semi-annual period, or if the Reset Rate Agent determines in its sole judgment that there is no suitable reference rate from which the Reset Rate may be determined, the Reset Rate for that period may be the Reset Rate most recently determined (except if there is no Reset Rate most recently determined, in which case the Reset Rate may be a rate mutually agreed upon by the Reset Rate Agent and Issuer reflecting current market conditions), such Reset Rate to remain in effect until the Reset rate Agent determines that there is a suitable reference rate at which time the Reset Rate Agent may determine a new Reset Rate for the period ending on the next Reset Rate Determination Date. The applicable per annum Reset Rate for a note that is subject to an increased accretion rate may be determined as to any period for which such increase is applicable as follows in each case until a new Reset Rate is in effect:

effective May 15, 2004, the applicable per annum Reset Rate on such note will be the Two-Year Reset Rate established on the Reset Rate Determination Date three business days preceding May 15, 2004;

effective May 15, 2006, the applicable per annum Reset Rate on such note will be the Five-Year Reset Rate established on the Reset Rate Determination Date three business days preceding May 15, 2006;

effective May 15, 2010, the applicable per annum Reset Rate on such note will be the One-Year Reset Rate established on the Reset Rate Determination Date three business days preceding Nov. 15, 2009;

effective May 15, 2011, the applicable per annum Reset Rate on such note will be the Five-Year Reset Rate established on the Reset Rate Determination Date three business days preceding May 15, 2011;

effective May 15, 2015, the applicable per annum Reset Rate on such note will be the One-Year Reset Rate established on the Reset Rate Determination Date three business days preceding Nov. 15, 2014;

effective May 15, 2016, the applicable per annum Reset Rate on such note will be the Five-Year Reset Rate established on the Reset Rate Determination Date three business days preceding May 15, 2016;

effective May 15, 2020, the applicable per annum Reset Rate on such note will be the One-Year Reset Rate established on the Reset Rate Determination Date three business days preceding Nov. 15, 2019.

Notwithstanding the foregoing:

if a note first becomes subject to an increased accretion rate (or first becomes subject to an increased accretion rate following a reversion of the accretion rate to 3%) on or after May 15, 2008, but not later than Nov. 15, 2009, the initial Reset Rate may be the Two-Year Reset Rate established on the Reset Rate Determination Date three business days preceding May 15, 2008 and thereafter the application Reset Rate may be determined in accordance with the prior sentence;

if a note first becomes subject to an increased accretion rate (or first becomes subject to an increased accretion rate following a reversion of the accretion rate to 3%) on or after May 15, 2013, but not later than Nov. 15, 2014, the initial Reset Rate may be the Two-Year Reset Rate established on the Reset Rate Determination Date three business days preceding May 15, 2013 and thereafter the applicable Reset Rate may be determined in accordance with the prior sentence; and if a note first becomes subject to an upward adjustment of accretion rate (or first becomes subject to an upward adjustment following a reversion of the accretion rate to 3%) on or after May 15, 2018, but not later than Nov. 15, 2019, the initial Reset Rate may be the Two-Year Reset Rate established on the Reset Rate Determination Date three business days preceding May 15, 2018 and thereafter the applicable Reset Rate may be determined in accordance with the prior sentence.

If an increased accretion rate is in effect for a particular semi-annual period, Issuer may pay a portion of the increased accretion rate as cash interest at an annualized rate of 0.25% (0.125% per semi-annual period) of the Applicable Principal Amount.

In the event of an increased accretion rate, Issuer may pay cash interest on each May 15 or November 15 to holders of record on the preceding May 1 or November 1, as the case may be. Cash interest may be determined on the basis of a 360-day year, consisting of twelve 30-day months.

In the event of an increased accretion rate, the accreted principal amount of the notes may increase at a rate greater than the initial accretion rate, and the maturity value of the notes may exceed their initial maturity value of $1,000. The redemption and repurchase prices set forth in the tables below may also increase.

The "closing sales price" of the common stock of Support Company on any date may mean the closing per share sale price (or if no closing sales price is reported, the average of the bid and ask prices or, if more than one in either case, the average of the average bid and the average asked prices) on the date as reported in composite transactions for the principal U.S. securities exchange on which the common stock of Support Company is traded or, if the common stock of Support Company is not listed on a U.S. national or regional securities exchange, as reported by the Nasdaq system.

In the event of an increased accretion rate, Issuer may disseminate a press release through Reuters Economic Services or Bloomberg Business News (for example) containing this information or publish the information on its web site on the World Wide Web or through such other public medium as Issuer may use at the time.

Reset Rate Agent; Determinations Conclusive

Issuer may appoint a Reset Rate Agent. For the determination of the Reset Rate, the Reset Rate Agent may seek indicative reference rates from three nationally recognized investment banks. The determination of any Reset Rate may be conclusive and binding upon the Reset Rate Agent, Support Company, Issuer, the trustee and the holders of the notes, in the absence of manifest error.

The Reset Rate Agent may be removed at any time by Issuer giving at least sixty days' written notice to the Reset Rate Agent. The Reset Rate Agent may resign at any time upon giving at least thirty days' written notice.

Tax Event According to the General Embodiment

Issuer may elect to pay cash interest on the notes from and after the date a tax event (as defined below) occurs instead of accreting the principal amount of the notes. If that happens, the principal amount on which Issuer pays interest may be restated and may be equal to the accreted principal amount as of the day of restatement. This restated principal amount may be the amount due at maturity. If Issuer elects this option, interest may be based on a 360-day year comprised of twelve 30-day months. Interest may accrue from Issuer's option exercise date and may be payable semi-annually in arrears on May 15 and November 15 (each, an "Interest Payment Date"); provided in the event that Issuer exercises its option to commence paying cash interest as of a date less than 60 days prior to any Interest Payment Date, the first payment of cash interest may be made on the Interest Payment Date next succeeding such Interest Payment Date.

The term "tax event" may mean the receipt by Issuer of an opinion of a nationally recognized independent tax counsel experienced in such matters to the effect that, as a result of:

a) any amendment to or change (including any announced prospective change (which will not include a proposed change)) in the laws (or regulations thereunder) of the United States or any political subdivision or taxing authority of the United States or any political subdivision, provided that a tax event will not occur more than 90 days before the effective date of any prospective change in such laws or regulations; or b) any judicial decision or official administrative pronouncement, ruling, regulatory procedure, notice or announcement, including any notice or announcement of intent to adopt such procedures or regulations (an "Administrative Action"); or c) any amendment to or change in the administrative position or interpretation of any Administrative Action or judicial decision that differs from the theretofore generally accepted position, in each case, by any legislative body, court, governmental agency or regulatory body, irrespective of the manner in which such amendment or change is made known, which amendment or change is effective or such Administrative Action or decision is announced, in each case, on or after the date of original issuance of the note;

there is more than an insubstantial risk that interest payable on the note, including original issue discount and any interest payable pursuant to an increased accretion rate, either:
  a) would not be deductible on a current accrual basis; or
  b) not be deductible under any other method, in whole or in part, by Issuer for United States federal income tax purposes.

Interest According to the General Embodiment

Issuer may not necessarily pay cash interest on the notes unless an increased accretion rate is in effect or Issuer elects to do so following a tax event. Interest may be based on a 360-day year comprised of twelve 30-day months, and may be payable semi-annually on May 15 and November 15. If an increased accretion rate is in effect for a semi-annual period, Issuer may pay a portion of the increased accretion rate as cash interest at the rate of 0.25% per annum (or 0.125% per semi-annual period) of the Applicable Principal Amount. Cash interest following a tax event and Issuer's election to pay the interest in cash may be paid at a rate equal to the accretion rate that would be in effect from time to time if Issuer had not elected to pay cash.

The record date for the payment of cash interest to holders may be May 1 and November 1 of each year. Issuer may be required to give notice to the registered holders of the notes, no later than 15 days prior to each record date, of the amount of cash interest to be paid as of the next interest payment date. Issuer may pay interest on the notes to registered holders of the notes as of the record date.

Redemption Rights According to the General Embodiment

On or after May 15, 2006, Issuer may redeem for cash all or part of the notes at any time, upon not less than 30 days nor more than 60 days' notice by mail to holders of the notes, for a price equal to the then accreted principal amount plus any accrued and unpaid cash interest to the redemption date.

Table 1 below shows redemption prices of notes at May 15, 2006, and at each following May 15 prior to maturity and the price at maturity on May 15, 2021, assuming that neither an increased accretion rate nor a tax event occurs. The prices reflect the accreted principal amount calculated through each date. The redemption price of a note redeemed between these dates may include an additional increase in the accreted principal amount accrued since the immediately preceding date in the Table to the actual redemption date.

TABLE 1

| Redemption Date | Accrued Interest | Redemption Price |
| --- | --- | --- |
| May 15, 2006 | $88.50 | $639.76 |
| May 15, 2007 | $107.84 | $659.10 |
| May 15, 2008 | $127.76 | $679.02 |
| May 15, 2009 | $148.28 | $699.54 |
| May 15, 2010 | $169.43 | $720.69 |
| May 15, 2011 | $191.21 | $742.47 |
| May 15, 2012 | $213.65 | $764.91 |
| May 15, 2013 | $236.77 | $788.03 |
| May 15, 2014 | $260.59 | $811.85 |
| May 15, 2015 | $285.13 | $836.39 |
| May 15, 2016 | $310.41 | $861.67 |
| May 15, 2017 | $336.45 | $887.71 |
| May 15, 2018 | $363.28 | $914.54 |
| May 15, 2019 | $390.92 | $942.18 |
| May 15, 2020 | $419.40 | $970.66 |
| May 15, 2021 (Maturity) | $448.74 | $1,000.00 |

If Issuer decides to redeem fewer than all of the outstanding notes, the trustee may select the notes to be redeemed by lot, on a pro rata basis, or by another method the trustee considers fair and appropriate.

If the trustee selects a portion of a holder's notes for partial redemption and the holder converts a portion of the same notes, the converted portion may be deemed to be from the portion selected for redemption. Each note may be redeemed in whole.

Conversion Rights According to the General Embodiment

Subject to the conditions described below, holders may convert their notes into shares of the common stock of Support Company at a conversion ratio of 7.9318 shares of the common stock of Support Company per $1,000 principal amount at maturity of notes (equivalent to an initial conversion price of $69.50 per share of the common stock of Support Company). The conversion ratio and the equivalent conversion price of a note in effect at any given time may be referred to as the applicable conversion ratio and the Accreted Conversion Price, respectively, and may be subject to adjustment as described below. If a note has been called for redemption, the holder may be entitled to convert the note from the date of notice of the redemption until the close of business on the business day immediately preceding the date of redemption. A holder may convert fewer than all of such holder's notes so long as the notes converted are an integral multiple of $1,000 principal amount at maturity, subject to an upward adjustment in the event there is an increased accretion rate.

Holders may surrender their notes for conversion into the common stock of Support Company prior to maturity if any of the following conditions is satisfied:

(1) during any quarterly conversion period, if the closing sales price of the common stock of Support Company for a least 20 trading days in the 30 consecutive trading days ending on the first day of the quarterly conversion period is more than the Applicable Percentage of the Accreted Conversion Price on the first day of such quarterly conversion period. A quarterly conversion period may be the period from and including the $12^{th}$ trading day in a fiscal quarter of Support Company to but not including the $12^{th}$ trading day in the immediately following fiscal quarter of Support Company;

(2) during the five business day period following the ten business days after any nine consecutive trading day period in which the trading price for a note for each day of such period was less than 95% of the product of the closing sales price of the common stock of Support Company multiplied by the number of shares into which such note is convertible for that period (the "95% Trading Exception"); provided however, that if at the time of conversion pursuant the 95% Trading Exception the closing sales price of the common stock of Support Company is greater than 100% of the Accreted Conversion Price but equal to or less than the Applicable Percentage of the Accreted Conversion Price, then the holders may receive, in lieu of the common stock of Support Company based on the applicable conversion rate, cash or the common stock of Support Company or a combination of both, at Issuer's option, with a value equal to the accreted principal amount of the notes on the conversion date ("Accreted Value Conversion"). If there is an Accreted Value Conversion, Issuer may choose to pay the accreted principal amount in cash or the common stock of Support Company or a combination of both at Issuer's option. In the event Issuer chooses to pay in the common stock of Support Company or a combination of cash and the common stock of Support Company, the common stock of Support Company may be valued at the closing sales price for the five trading days ending on the third trading day prior to the date of conversion. If Issuer elects to pay all or a portion of the accreted principal amount upon a Accreted Value Conversion in the common stock of Support Company, Issuer may be required to notify holders not less than nine trading days prior to the beginning of the five business day period in which holders can convert pursuant to an Accreted Value Conversion;

(3) if the notes have been called for redemption; or (4) upon the occurrence of specified corporate transactions described under "Conversion Upon Specified Corporate Transactions."

Conversation Upon Satisfaction of Market Price Condition

During any quarterly conversion period if the closing sales price of the common stock of Support Company for at least 20 trading days in the 30 consecutive trading days ending on the first day of such quarterly conversion period is more than the Applicable Percentage of the Accreted Conversion Price on the first day of such conversion period, then holders may surrender their notes for conversion into the common stock of Support Company prior to maturity. A quarterly conversion period may be the period from and including the $12^{th}$ trading day in a fiscal quarter of Support Company to but not including the $12^{th}$ trading day in the immediately following fiscal quarter of Support Company.

The conversion agent, which may initially be Trustee, may, on Issuer's behalf determine if the notes are convertible and notify Issuer and the trustee.

Conversion Upon Satisfaction of Trading Price Condition

During the five business day period following the ten business days after any nine consecutive trading day period in which the trading price for a note for each day of such period was less than 95% of the product of the closing sales price of the common stock of Support Company multiplied by the number of shares into which such note is convertible for the period, then holders may surrender their notes for conversion into the common stock of Support Company prior to maturity; provided however, that if at the time of conversion pursuant the 95% Trading Exception the closing sales price of the common stock of Support Company is greater than 100% of the Accreted Conversion Price but equal to or less than the Applicable Percentage of the Accreted Conversion Price, then the holders may receive, in lieu of the common stock of Support Company based on the applicable conversion rate, cash or the common stock of Support Company or a combination of both, at Issuer's option, with a value equal to the accreted principal amount of the notes on the conversion date. If there is an Accreted Value Conversion, Issuer may choose to pay the accreted principal amount in cash or the common stock of Support Company or a combination of both at Issuer's option. In the event Issuer chooses to pay in the common stock of Support Company or a combination of cash and the common stock of Support Company, the common stock of Support Company may be valued at the closing sales price for the five trading days ending on the third trading day prior to the date of conversion. If Issuer elects to pay all or a portion of the accreted principal amount upon a Accreted Value Conversion in the common stock of Support Company, Issuer may be required to notify holders not less than nine trading days prior to the beginning of the five business day period in which holders can convert pursuant to an Accreted Value Conversion. The "trading price" of the notes on any date of determination may mean the average of the secondary market bid quotations per note obtained by the conversion agent for $10,000,000 principal amount at maturity of the notes at approximately 3:30 p.m., New York City time, on such determination date from three independent nationally recognized securities dealers Issuer selects, provided that if at least three such bids cannot reasonably be obtained by the conversion agent, but two such bids are obtained, then the average of the two bids may be used, and if only one such bide can reasonably be obtained by the conversion agent, this one bide may be used. If the conversion agent cannot reasonably obtain at least one bid for $10,000,000 principal amount at maturity of the notes from a nationally recognized securities dealer or in Issuer's reasonable judgment, the bid quotations are not indicative of the secondary market value of the notes, then the trading price of the notes may be deemed to equal (a) the then-applicable conversion rate of the notes multiplied by (b) the closing price on the New York Stock Exchange of the common stock of Support Company on such determination date. The conversion agent may not necessarily have an obligation to determine the trading prices of the notes unless requested by Issuer; and Issuer may not necessarily have an obligation to make such request unless a holder of notes provides Issuer with reasonable evidence that the trading price of the notes would be less then 95% of the product of the closing sales price of the common stock of Support Company and the number of shares into which the notes are convertible; at which time, Issuer may instruct the conversion agent to determine the trading price of the notes beginning on the next trading day and on each successive trading day until the trading price is greater than or equal to 95% of the product of the closing sales price of the common stock of Support Company and the number of shares into which the notes are convertible.

Conversion Upon Notice of Redemption

A holder may surrender for conversion any of the notes called for redemption at any time following receipt of a notice of redemption until the close of business one business day prior to the redemption date, even if the notes are not otherwise convertible at such time. If a holder has already delivered a purchase notice or a Change in Control purchase notice with respect to a note, however, the holder may not necessarily be able to surrender the note for conversion until the holder has withdrawn the notice in accordance with the Indenture.

Conversion Upon Specified Corporate Transactions

Even if the market price condition described above has not occurred, if Support Company elects to:

(1) distribute to all holders of the common stock of Support Company certain rights entitling them to purchase, for a period expiring within 60 days, the common stock of Support Company at less than the quoted price at the time, or (2) distribute to all holders of the common stock of Support Company, Support Company' assets, debt securities or certain rights to purchase its securities, which distribution has a per share value exceeding 15% of the closing price of the common stock of Support Company on the day preceding the declaration date for such distribution.

Issuer may be required to notify the holders of notes at least 20 days prior to the ex-dividend date for such distribution. Once Issuer has given such notice, holders may surrender their notes for conversion at any time until the earlier of close of business on the business day prior to the ex-dividend date or Issuer's announcement that such distribution will not take place. No adjustment to the ability of a holder to convert may necessarily be made if the holder will otherwise participate in the distribution without conversion.

In addition, if Support Company is a party to a consolidation, merger or binding share is exchange pursuant to which the common stock of Support Company would be converted into cash, securities or other property, a holder may surrender notes for conversion at any time from and after the date which is 15 days prior to the anticipated effective date of the transaction until 15 days after the actual date of such transaction. If Support Company is a party to a consolidation, merger or binding share exchange pursuant to which the common stock of Support Company is converted into cash, securities or other property, then at the effective time of the transaction, the right to convert a note into Support Company common stock may be changed into a right to convert it into the kind and amount of cash, securities and other property which the holder would have received if the holder had converted its notes immediately prior to the transaction. If the transaction also constitutes a Change in Control, the holder may require Issuer to purchase all or a portion of the holder's notes (as described under "Change in Control.").

Additional Conversion Information

The conversion rate may be 7.9318 shares of common stock of Support Company for each note. This may be equivalent to an initial conversion price of $69.50 per share of common stock of Support Company based on the issue price of the notes. Holders may not necessarily receive any cash payment representing any accrued interest upon conversion of a note, except any accrued and unpaid cash interest which is payable as a result of an increased accretion rate. Additionally, holders may not necessarily receive fractional shares upon conversion of the notes. Instead, upon conversion Issuer may deliver to the holders a fixed number of shares of common stock and any cash payment to account for fractional shares. The cash payment for fractional shares may be based on the closing price of common stock of Support Company on the trading day immediately prior to the conversion date. Delivery of the common stock of Support Company may be deemed to satisfy Issuer's obligation to pay the principal amount of the notes, including accrued cash interest. Accrued cash interest may be deemed paid in full rather than canceled, extinguished or forfeited. Issuer may not necessarily adjust the conversion ratio to account for the accrued cash interest.

If a holder wishes to exercise the holder's conversion right, the holder may be required to deliver an irrevocable conversion notice, together, if notes in definitive form have been issued, with the definitive security, to the conversion agent who may, on the holder's behalf, convert the notes into the common stock of Support Company. The holder may obtain copies of the required form of the conversion notice from the conversion agent.

Upon a conversion, based on Issuer's treatment of the notes for U.S. federal income tax purposes, a holder may be required to recognized ordinary income upon a conversion of a note into the common stock of Support Company equal to the excess, if any, between the value of the stock received on the conversion and the holder's adjusted tax basis in the note.

If a holder submits a note for conversion after Issuer has elected to exercise Issuer's option to pay cash payment pursuant to an interest adjustment, between a record date and the opening of business on the next Interest Payment Date (except for notes or portions of notes called for redemption on a redemption date occurring during the period from the close of business on a record date and ending on the opening of business on the first business day after the next Interest Payment Date, or if this Interest Payment Date is not a business day, the second business day after the Interest Payment Date), the holder may be required to pay Issuer an amount equal to the interest payable on the converted principal amount.

Adjustments to Conversion Rate

The conversion rate may be subject to adjustment upon the following events:

(a) the payment of dividends and other distributions to all holders of the common stock of Support Company on the common stock of Support Company payable exclusively in the common stock of Support Company;

(b) the issuance to all holders of the common stock of Support Company of rights or warrants that allow the holders to purchase the common stock of Support Company at less than the current market price; provided that no adjustment will be made if holders of the notes may participate in the transaction on a basis and which notice that Support Company' board of directors determines to be fair and appropriate or in some other cases;

(c) subdivisions or combinations of the common stock of Support Company;

(d) the payment of dividends and other distributions to all holders of the common stock of Support Company consisting of evidences of Support Company' indebtedness, securities, capital stock or assets, except for dividends and other distributions paid in cash and those rights or warrants referred to in the next paragraph relating to stockholders rights plans, provided that no adjustment will be made if all holders of the notes may participate in the transactions;

(e) the payment to holders of the common stock of Support Company in respect of a tender or exchange offer, other than an odd-lot offer, by Support Company or any of its subsidiaries for the common stock of Support Company to the extent that the offer involves aggregate consideration that, together with (1) any cash and the fair market value of any other consideration payable in respect of any tender offer by Support Company or any of its subsidiaries for shares of the common stock of Support Company consummated within the preceding 12 months not triggering a conversion price adjustment and (2) all-cash distributions to all or substantially all stockholders made within the preceding 12 months not triggering a conversion price adjustment, exceeds an amount equal to 15% of the market capitalization of the common stock of Support Company on the expiration date of the tender offer; or (f) the distribution to all or substantially all stockholders of all-cash distributions in an aggregate amount that, together with (1) any cash and the fair market value of any other consideration payable in respect of any tender offer by Support Company or any of its subsidiaries for shares of the common stock of Support Company consummated within the preceding 12 months not triggering a conversion price adjustment and (2) all other all-cash distributions to all or substantially all stockholder made within the preceding 12 months not triggering a conversion price adjustment, exceeds an amount equal to 15% of the market capitalization of the common stock of Support Company on the business day immediately preceding the day on which Support Company declares the distribution.

If Support Company were to adopt a stockholders rights plan under which it issued rights providing that each share of the common stock of Support Company issued upon conversion of the notes at any time prior to the distribution of separate certificates representing the rights will be entitled to receive the rights, there may not necessarily be any adjustment to the conversion rate as a result of:

(1) the issuance of the rights;
(2) the distribution of separate certificates representing the rights;
(3) the exercise of redemption of the rights in accordance with any rights agreement; or
(4) the termination of invalidation of the rights.

Issuer may increase the conversion rate as a permitted by law for at least 20 days, so long as the increase is irrevocable during the period. No adjustment in the Accreted Conversion Price may necessarily be required unless the adjustment would require an increase or decrease of at least 1% of the Accreted Conversion Price. If the Adjustment is not made because the adjustment does not change the Accreted Conversion Price by more than 1%, then the adjustment that is not made may be carried forward and taken into account in any future adjustment. Except as specifically described above, the Accreted Conversion Price may not necessarily be subject to adjustment in the case of the issuance of any of the common stock of Support Company, or securities convertible into or exchangeable for the common stock of Support Company.

Repurchase Right According to the General Embodiment

Each holder may have the right to require Issuer to repurchase the notes on May 15, 2004, May 15, 2006, May 15, 2011 and May 15, 2016. Issuer may be required to repurchase any outstanding notes for which a holder delivers a written purchase notice to the paying agent. This notice may be required to be delivered during the period beginning at any time from the opening of business on the date that is 20 business days prior to the relevant repurchase date until one business day prior to the relevant repurchase date. Under the terms of the Indenture, Issuer may have the right to pay the repurchase price of the notes at any time during the five business days following the repurchase date. If the purchase notice is given and withdrawn during the period, Issuer may not necessarily be obligated to repurchase the related notes. Issuer's repurchase obligation may be subject to some additional conditions. Also, Issuer's ability to satisfy its repurchase obligations may be affected by various factors. Issuer may not have the ability to raise funds necessary to repurchase the notes following a Change in Control or at the option of the holder.

The repurchase price payable may be equal to the accreted principal amount plus accrued and unpaid cash interest through the repurchase date. The repurchase prices of a note (assuming that an increase in the accretion rate does not occur) as of each of the repurchase dates may be:

$602.77 per note on May 15, 2004;
$639.76 per note on May 15, 2006;
$742.47 per note on May 15, 2011; and
$861.67 per note on May 15, 2016.

Issuer may choose to pay the repurchase price in cash or the common stock of Support Company, or a combination of both.

If Issuer has previously exercised its option to pay cash interest instead of accreting the principal amount of the notes following a tax event, the repurchase price may be equal to the restated principal amount plus accrued and unpaid interest through the repurchase date.

If Issuer chooses to pay the repurchase price in whole or in part in the common tock of Support Company or a combination of cash and the common stock of Support Company, Issuer may be required to give notice on a date not less than 20 business days prior to each repurchase date to all holders at their addresses shown in the register or the registrar, and to beneficial owners as required by applicable law (i.e. if no notice is given, Issuer may be required to pay the repurchase price with cash), stating among other things:

(1) whether Issuer will pay the repurchase price of the notes in the common stock of Support Company, or any combination of cash and the common stock of Support Company, specifying the percentages of each;
(2) the method of calculating the price of the common stock of Support Company; and
(3) the procedures that holders must follow to require Issuer to repurchase the holder's notes.

Simultaneously with Issuer's notice of repurchase, Issuer may disseminate a press release through Reuters Economic Services or Bloomberg Business News (for example) containing this information or publish the information on its web site on the World Wide Web or though such other public medium as Issuer may use at that time.

A holder's notice electing to require Issuer to repurchase the holder's notes may be required to state:

(1) if certificated notes have been issued, the notes' certificate numbers, or if not certificated, the holder's notice must comply with appropriate DTC procedures;
(2) the portion of the principal amount at maturity of the notes to be repurchased, in multiples of $1,000;
(3) that the notes are to be repurchased by Issuer pursuant to the applicable provisions of the notes; and
(4) in the event Issuer elects, pursuant to the notice that it is required to give, to pay the repurchase price in shares of the common stock of Support Company, in whole or in part, but the repurchase price is ultimately to be paid to the holder entirely in cash because any of the conditions specified in the Indenture to payment of the repurchase price or portion of the repurchase price in shares of the common stock of Support Company is not satisfied prior to the close of business on the last day prior to the repurchase date, as described below, whether the holder elects;
    (a) to withdraw the repurchase notice as to some or all of the notes to which it relates, or
    (b) to receive cash in respect to the entire repurchase price for all notes or portions of notes subject to the purchase notice.

If the holder fails to indicate the holder's choice with respect to the election described in the bullet point (4) above, the holder may be deemed to have elected to receive cash in respect of the entire repurchase price for all notes subject to the repurchase notice in these circumstances.

A holder may withdraw any purchase notice by a written notice of withdrawal delivered to the paying agent prior to the close of business one business day prior to the repurchase date. The notice of withdrawal may be required to state:

(1) the principal amount at maturity of the withdrawn notes;
(2) if certificated notes have been issued the certificate numbers of the withdrawn notes, or if not certificated, the holder's notice must comply with appropriate DTC procedures; and
(3) the principal amount at maturity, if any, which remains subject to the purchase notice.

If Issuer elects to pay the repurchase price, in whole or in part, in shares of the common stock of Support Company, the number of shares to be delivered by Issuer may be equal to the portion of the repurchase price to be paid in the common stock of Support Company divided by the market price (as defined herein) of one share of the common stock of Support Company as determined by Issuer in its purchase notice. The cash payment for fractional shares may be based on the closing price of common stock of Support Company on the trading day immediately prior to the repurchase date.

The "market price" may mean the average of the closing sales price of the common stock of Support Company for the five trading day period ending on the third business day prior to the applicable purchase date (if the third business day prior to the applicable repurchase date is a trading day, or if not, then on the last trading day prior to the third business day), appropriately adjusted to take into account the occurrence, during the period commencing on the first of the trading days during the five trading day period and ending on the repurchase date, of some events that would result in an adjustment of the conversion rate with respect to the common stock of Support Company.

Because the market price of the common stock of Support Company may be determined prior to the applicable repurchase date, holders of notes may bear the market risk with respect to the value of the common stock of Support Company to be received from the date the market price is determined to the repurchase date. Issuer may pay the repurchase price or any portion of the repurchase price in shares of common stock of Support Company only if the information necessary to calculate the market price is published in a daily newspaper of national circulation or other widely disseminated public source.

Upon determination of the actual number of shares of common stock of Support Company to be paid upon repurchase of the notes, Issuer may disseminate a press release through Reuters Economic Services or Bloomberg Business News (for example) containing this information or publish the information on its web site on the World Wide Web or through such other public medium as it may use at that time.

A holder may be required to either effect book-entry transfer or deliver the notes, together with necessary endorsements, to the office of the paying agent after delivery of the repurchase notice to receive payment of the repurchase price. A holder may receive payment of the repurchase price no later than five business days after the repurchase date.

Change in Control According to the General Embodiment

If a Change in Control as defined below occurs, a holder of the notes may have the right, at its option, to require Issuer to repurchase all of the holder's notes not previously called for redemption, or any portion of the principal amount thereof, that is equal to $1,000 or an integral multiple of $1,000. The price Issuer may be required to pay may equal the accreted principal amount plus any accrued and unpaid cash interest.

Within 30 days after the occurrence of a Change in Control, Issuer may be obligated to give to the holders of the notes notice of the Change in Control and of the repurchase right arising as a result of the Change in Control. Issuer may also be required to deliver a copy of this notice to the trustee. To exercise the repurchase right, a holder of the notes may be required to deliver on or before the 30$^{th}$ day after the date of Issuer's notice irrevocable written notice to the trustee of the holder's exercise of its repurchase right, together with the notes with respect to which the right is being exercised. Issuer may be required to repurchase the notes on the date that is 45 days after the date of its notice.

A Change in Control may be deemed to have occurred at the time after the notes are originally issued that any of the following occurs:

(1) any person, including any syndicate or group deemed to be a "person" under Section 13(d)(3) of the Exchange Act, acquires beneficial ownership, directly or indirectly, through a purchase, merger or other acquisition transaction or series of transactions, of the common stock of Support Company entitling the person to exercise 50% or more of the total voting power of all common stock of Support Company that is entitled to vote generally in elections of directors, other than an acquisition by Support Company, any of its subsidiaries or any of its employee benefit plans; or (2) Support Company merges or consolidates with or into any other person, any merger of another person into Support Company, or Support Company conveys, sells, transfers or leases all or substantially all of its assets to another person, other than any transaction:

(a) that does not result in any reclassification, conversion, exchange or cancellation of outstanding common stock of Support Company;

(b) pursuant to which the holders of the common stock of Support Company immediately prior to the transaction have the entitlement to exercise, directly or indirectly, 50% or more of the total voting power of all the common stock of Support Company entitled to vote generally in the election of directors of the continuing or surviving corporation immediately after the transaction; or (c) which is effected solely to change the jurisdiction of incorporation of Support Company and results in a reclassification, conversion or exchange of outstanding shares of the common stock of Support Company solely into the common stock of the surviving corporation.

However, a Change in Control may not necessarily be deemed to have occurred if either:

(A) the closing sales price per share of the common stock of Support Company for any five trading days within the period of 10 consecutive trading days ending immediately after the later of the Change in Control or the public announcement of the Change in Control, in the case of a Change in Control relating to an acquisition of capital stock, or the period of 10 consecutive trading days ending immediately before the Change in Control, in the case of Change in Control relating to a merger, consolidation or asset sale, equals or exceeds 105% of the Accreted Conversion Price of the notes in effect on each of those trading days or (B) all of the consideration in a merger or consolidation otherwise constituting a Change in Control under clause (1) and/or clause (2) above, other than cash payments not to exceed 5% of the total value of such merger or consolidation (excluding cash payments for fractional shares and cash payments made pursuant to dissenters' appraisal rights), consists of shares of common stock traded on a national securities exchange or quoted on the Nasdaq National Market (or will be traded or quoted immediately following the merger or consolidation) and as a result of a merger or consolidation the notes become convertible into such common stock of the surviving corporation.

For Purposes of These Provisions (a) the conversion price may be equal to the accreted principal amount divided by the applicable conversion rate;

whether a person is a "beneficial owner" may be determined in accordance with Rule 13d-3 under the Exchange Act; and "person" may include any syndicate or group that would be deemed to be a "person" under Section 13(d)(3) of the Exchange Act.

The foregoing provisions would not necessarily provide a holder of notes with protection if Support Company is involved in a highly leveraged or other transaction that may adversely affect the holders.

If a Change in Control were to occur, Issuer may not have sufficient funds available in the time period specified to repurchase the notes upon a Change in Control. In addition, Support Company may have, and may in the future incur, other indebtedness with similar change in control provisions permitting its holders to accelerate or to require Issuer to repurchase its indebtedness upon the occurrence of similar events or on some specified dates. If Issuer fails to repurchase the notes when required following a Change in Control, it may be in default under the Indenture.

Restrictions on Issuer According to the General Embodiment

Lien on Assets

If Issuer mortgages, pledges or otherwise subjects to any lien the whole or any part of any property or assets which it now owns or acquires in the future, then Issuer may secure the notes and any other of its obligations which may then be outstanding and entitled to the benefits of a covenant similar in effect to this covenant to the same extent and in the same proportion as the debt or other obligation that is secured by that mortgage, pledge or other lien. The notes may remain secured for the same period as the other debt remains secured. Exceptions to this requirement may include the following:

(1) purchase-money mortgages or liens;
(2) liens on any property or asset that existed at the time when Issuer acquired that property or asset;
(3) any deposit or pledge to secure public or statutory obligations;
(4) any deposit or pledge with any governmental agency required to qualify Issuer to conduct its business, or any part of its business, or to entitle Issuer to maintain self-insurance or to obtain the benefits of any law relating to workmen's compensation, unemployment insurance, old age pensions or other social security;
(5) any deposit or pledge with any court, board, commission or governmental agency as security related to the proper conduct of any proceeding before it; or
(6) any mortgage, pledge or lien on any property or asset of any of Issuer's affiliates, including, without limitation, Support Company, even if the affiliate may have acquired that property or asset from Issuer.

Limitation on Merger, Consolidation and Sales of Assets

Neither Issuer nor Support Company may consolidate with or merge into any other entity or convey, transfer or lease substantially all of its properties and assets to any person, and neither Issuer nor Support Company may permit any person to consolidate with or merge into it or convey, transfer or lease substantially all of its properties and assets to it, unless:

(1) in case Issuer or Support Company consolidates or merges into another person or conveys, transfers or leases substantially all of its properties and assets to another person, the successor assumes by supplemental indenture the obligations of its predecessor;
(2) after giving effect to the transaction, there is no default under the Indenture; and
(3) if, as a result of any consolidation or merger or conveyance, transfer or lease described in this covenant, properties or assets of Issuer would become subject to any lien which would not be permitted by the asset lien restriction described above without equally and ratably securing the notes as described above, Issuer or such successor person, as the case may be, will take the steps as are necessary effectively to secure the notes equally and ratably with, or prior to, all indebtedness secured by those liens as described above.

In case Issuer or Support Company consolidates or merges into another person or conveys, transfers or leases substantially all of its properties and assets to another person, that person may be Issuer's or Support Company' successor, and Issuer may be relieved of all obligations under the notes and the Indenture and/or Support Company may be relieved of all obligations under the support agreement and the Indenture, as the case may be.

Events of Default According to the General Embodiment

An "event of default" regarding the notes may be any one of the following events:

(1) failure to pay interest on a note for 90 days after payment is due;
(2) failure to pay principal or any premium on any note when due whether at maturity, when called for redemption, when required to be repurchased by holders of the notes or otherwise;
(3) failure to perform, or breach of, any covenant or warranty in the notes or in the Indenture and applicable to the notes for 90 days after notice to Issuer and Support Company by the trustee or by holders of at least 25% in principal amount of the outstanding notes; and
(4) certain events of bankruptcy, insolvency and reorganization of Issuer or Support Company.

If an event of default applicable to the notes occurs and is continuing, either the trustee or the holders of at least 25% in principal amount of the outstanding notes may declare the principal of all the notes, together with any accrued interest on the notes, to be immediately due and payable by notice in writing to Issuer and Support Company. If it is the holders of notes who give notice of that declaration of acceleration to Issuer and Support Company, then they may also be required to give notice to the trustee.

In order for holders of notes to initiate proceedings for a remedy under the Indenture, holders of at least 25% in principal amount of the outstanding notes may first be required to give notice to Issuer and Support Company as provided above, may be required to request that the trustee initiate a proceeding in its own name and may be required to offer the trustee a reasonable indemnity against costs and liabilities. If the trustee still refuses for 60 days to initiate the proceeding, and no inconsistent direction has been given to the trustee by holders of a majority of the outstanding notes, the holders may initiate a proceeding as long as they do not adversely affect the rights of any other holders.

The holders of a majority in principal amount of the outstanding notes may be required to rescind a declaration of acceleration relating to that series if Issuer or Support Company has paid or deposited with the trustee a sum sufficient to pay the amounts set forth in the applicable provisions of the Indenture and all events of default, besides the failure to pay principal due solely because of the declaration of acceleration, have been cured or waived.

If Issuer defaults on the payment of any installment of interest with respect to the notes and fails to cure the default within 90 days, or if Issuer defaults on the payment of principal with respect to the notes when it becomes due, then the trustee may require Issuer to pay all amounts due to the trustee with respect to the notes, with interest on the overdue principal, interest or any premium payments, in addition to the expenses of collection.

Notices

The trustee may be required to give notice to holders of the notes of a default, which remains uncured or has not been waived, that is known to the trustee within 90 days after the default has occurred. In the event of a default described in the third bullet point under "Events of Default," the trustee may not necessarily be required to give notice to the holders of notes until at least 60 days after the occurrence of such default. The trustee may withhold the notice if and so long as the board of directors, the executive committee or a trust committee of directors and/or responsible officers of the trustee in good faith determine that the withholding of notice is in the interest of the holders, except that the trustee may not necessarily be permitted to withhold the notice in the case of a default in the payment of principal, interest or any premium on any of the notes.

Waiver

The holders of a majority in principal amount of the outstanding notes may waive any past default or event of default except a default in the payment of principal interest or premium on the notes or a default relating to a covenant or provision that cannot be modified or amended without the consent of each affected holder.

Rights and Duties of Trustee According to the General Embodiment

The holders of a majority in principal amount of outstanding notes may direct the time, method and place of conducting any proceeding for any remedy available to the trustee with respect to the notes or exercising any trust or other power conferred on the trustee with respect to the notes. The trustee may decline to follow that direction if it would involve the trustee in personal liability or would be illegal. During a default, the trustee may be required to exercise the standard of care and skill that a prudent man would exercise under the circumstances in the conduct of his own affairs. The trustee may not necessarily be obligated to exercise any of its right or powers under the Indenture at the request or direction of any of the holders of notes unless those holders have offered to the trustee reasonable security or indemnity.

The trustee may be entitled, in the absence of bad faith on its part, to rely on an officer's certificate of Issuer or Support Company before taking action under the Indenture.

Supplemental Indentures According to the General Embodiment

Supplemental Indentures Requiring Consent of Holders

Issuer may, without the consent of any holder of the notes, enter into supplemental indentures for other specified purposes, including to cure any ambiguity or inconsistency in the Indenture or in the notes or make any other provisions with respect to matters or questions arising under the Indenture or the support agreement, as long as the interest of the holders of the notes are not adversely affected in any material respect.

Supplemental Indentures Requiring Consent of Holders

With the consent of the holders of more than a majority in principal amount of the outstanding notes, the Indenture may permit Issuer, Support Company and/or the trustee to supplement or modify in any way the terms of the Indenture with respect to that series or the rights of the holders of the notes. However, without the consent of each holder of the notes, Issuer, Support Company and the trustee may not necessarily be permitted to:

(1) reduce the principal of or premium on or change the stated final maturity of any note;
(2) reduce the rate of or change the time for payment of interest in any note;
(3) reduce or alter the method of computation of any amount payable upon redemption, repayment or repurchase of any note by Issuer (or the time when the redemption, repayment or purchase may be made);
(4) make the principal or interest on any note payable in a currency other than that stated in the note or change the place of payment;
(5) impair the right of any holder of notes to sue for payment of the principal, interest or premium on a note that would be due and payable at the maturity of that note or upon redemption;
(6) modify any provisions of the support agreement or share contribution agreement except as described under "Supplemental indentures not requiring consent of holders" above; or
(7) reduce the percentage of principal amount of the outstanding notes required to supplement the Indenture or to waive any of its provisions.

Description of Support Agreement According to the General Embodiment

Under a support agreement Support Company may agree to:

(1) own directly or indirectly all of Issuer's voting capital stock issued and outstanding at any time;
(2) make sure that Issuer maintains at all times a positive tangible net worth, as determined in accordance with generally accepted accounting principles;
(3) provide Issuer with any funds it needs to make any timely payment of principal, interest, or any premium on the notes, if it cannot obtain funds from other sources on commercially reasonable terms.

Issuer and Support Company may not necessarily be permitted to terminate the support agreement until all of the debt supported by the support agreement (including the notes) has been paid in full. Issuer and Support Company may not necessarily be permitted to amend the support agreement in any way that adversely affects a holder's rights unless the holder consents in writing.

If Issuer fails or refuses to take timely action to enforce Issuer's rights under the support agreement or if Issuer defaults in the timely payment of principal, interest or any premium, a holder may have the right to proceed directly against Support Company to enforce the rights under the support agreement or to obtain payment of the defaulted principal, interest or premium owed to the holder. The holder may have no recourse under the terms of the support agreement to or against the stock or assets of any operating company which may from time to time be owned directly or indirectly by Support Company. Except for the exclusion this stock and assets from recourse, Support Company' obligations under the support agreement may rank equally with its other unsecured and unsubordinated debt.

Support Company may be holding company, and therefore, its right and the right of its creditors (including the holders of the notes), to realize upon the assets of any subsidiary of Support Company, whether following any liquidation or reorganization of that subsidiary, or otherwise, may be subject to prior claims of creditors of each such subsidiary, except to the extent that claims of Support Company itself as a creditor of a subsidiary may be recognized.

Description of Share Contribution Agreement According to the General Embodiment

Under a share contribution agreement which Support Company may enter into in connection with the issuance of the notes, Support Company may agree to provide Issuer with any shares of the common stock of Support Company necessary to satisfy the conversion requirements under the notes (referred to as the share contribution agreement).

Issuer and Support Company may not necessarily be permitted to terminate the share contribution agreement until all of the notes have been paid in full. Issuer and Support Company may not necessarily be permitted to amend the share contribution agreement in any way that adversely affects a holder's rights unless the holder consents in writing.

If Issuer fails or refuses to take timely action to enforce Issuer's rights under the share contribution agreement or if Issuer defaults in the timely delivery of the common stock of Support Company upon conversion of the notes into the common stock of Support Company, a holder may have the right to proceed directly against Support Company to enforce the rights under the share contribution agreement in order to convert the notes into the common stock of Support Company.

Concerning the Trustee According to the General Embodiment

Trustee may be the trustee, registrar, paying agent and conversion agent.

Issuer, Support Company and their affiliates may maintain banking relationships in the ordinary course of business with the trustee. The trustee may also serve as trustee or paying agent for various debt issues by Issuer and other affiliates of Support Company.

Registration Rights According to the General Embodiment

Issuer may enter into a registration rights agreement with the initial purchasers (the "Registration Rights Agreement"). In the Registration Rights Agreement Issuer may agree, for the benefit of the holders of the notes and the common stock of Support Company issuable upon conversion of the notes until the date the notes and shares have been either registered under the Securities Act or distributed to the public pursuant to Rule 144 under the Securities Act or sold under Rule 144(k) under the Securities Act (together, the "Registrable Securities") that Issuer will, at its expense:
  (a) file with the SEC not later than the date 90 days after the earliest date of original issuance of any of the notes, a shelf registration statement on an appropriate form as Issuer deems appropriate covering the offer and sale by holders of all Registrable Securities;
  (b) use Issuer's reasonable best efforts to keep the shelf registration statement effective until the earliest of:
  (a) two years after the last date of original issuance of any of the notes; or
  (b) the date when the holders of the Registrable Securities are able to sell all such securities immediately without restriction pursuant to the volume limitation provisions of Rule 144 under the Securities Act.

Issuer may provide to each holder of Registrable Securities copies of the prospectus that is a part of the shelf registration statement, notify each holder when the shelf registration statement has become effective and take certain other actions required to permit public resales of the Registrable Securities. Issuer may suspend the availability of the shelf registration statement and any prospectus for a period not to exceed 45 days in any three-month period or 120 days in any twelve-month period, such period being, referred to as a "Deferral Period".

If:
  (1) the shelf registration statement has not been filed prior to or on the $90^{th}$ day following the earliest date of original issuance of any of the notes; or
  (2) the shelf registration statement has not been declared effective prior to or on the $210^{th}$ day following the earliest date of original issuance of any of the notes; and
  (3) at any time after the Deferral Period exceeds the number of days permitted in respect of such period, described in the preceding paragraph, by the $45^{th}$ or $120^{th}$ day, as the case may be (each, a "registration default"), then, so long as a registration default continues, Issuer may be required to pay liquidated damages in cash on each May 15 and November 15 of each year to the holder of record of the notes or the common stock of Support Company issued upon conversion of the notes to the holders of record on the immediately preceding May 1 or November 1. Liquidated damages may accrue on the Registrable Securities, from and including the date following the registration default to but excluding the day on which the registration default has been cured. Liquidated is damages may accrue,
  (1) in respect of the notes at a rate per year of 0.25% of the Applicable Principal Amount; and
  (2) in respect of any common stock of Support Company issued upon conversion of the notes at a rate per year of 0.25% of the Applicable Conversion Price (as defined below).

A holder may not necessarily be entitled to liquidated damages unless it has provided all information requested by Issuer prior to the deadline for response set forth in the Registration Rights Agreement and other information reasonably requested by Issuer from a holder for inclusion in a shelf registration statement.

The term "Applicable Conversion Price" may mean, as of any date of determination, the accreted principal amount per $1,000 principal amount at maturity of notes as of the date of determination divided by the conversion rate in effect as of such a date of determination or, if no notes are then outstanding, the conversion rate that would be in effect were notes then outstanding.

A holder who elects to sell any Registrable Securities pursuant to the shelf registration statement may be required to be named as a selling security holder in the related prospectus, may be required to deliver a prospectus to purchasers, may be subject to certain civil liability provisions under the Securities Act in connection with those sales and may be bound by the provisions of the Registration Rights Agreement that apply to a holder making such an election, including certain indemnification provisions.

Issuer may mail a notice and questionnaire to the holders of Registrable Securities not less than 30 days prior to the time Issuer intends in good faith to have the shelf registration statement declared effective.

No holder of Registrable Securities may necessarily be entitled to be named as a selling security holder in the shelf registration statement and no holder of Registrable Securities may necessarily be entitled to use the prospectus forming a part of the shelf registration statement for offers and resales of Registrable Securities at any time, unless such holder has returned a completed and signed notice and questionnaire to Issuer on or prior to the deadline for response set forth in such notice and questionnaire. Issuer may agree in the Registration Rights Agreement to give notice to all holders of the filing and effectiveness of a shelf registration statement by release made to Reuters Economic services and/or Bloomberg Business News (for example) or publish the information on Issuer's web site on the World Wide Web or though such other public medium as Issuer may use at that time.

Upon receipt of a completed notice and questionnaire, together with other information as may be reasonably requested by Issuer from a holder from time to time for inclusion in a shelf registration statement, Issuer may, as promptly as practicable, file amendments to a shelf registration statement or supplements to a related prospectus as are necessary to permit a holder to deliver a prospectus to purchasers of notes and common stock of Support Company issuable in respect of the notes (subject to Issuer's right to suspend the use of the prospectus as described above).

Issuer may to use its reasonable efforts to cause the common stock of Support Company issuable upon conversion of the notes to be listed on the New York Stock Exchange.

Limitation of Claims in Backruptcy According to the General Embodiment

If a bankruptcy proceeding is commenced in respect of Issuer or Support Company, the claim of a holder of notes may be, under Title 11 of the United States Code, limited to the issue price of the notes plus accrued interest from the date of issue to the commencement of the proceeding.

Form, Exchange, Registration and Transfer According to the General Embodiment

Issuer may issue the notes in book-entry form, without interest coupons. Issuer may or may not charge a service charge for any registration of transfer or exchange of the notes. Issuer may, however, require the payment of any tax or other governmental charge payable for that registration.

Notes may be exchangeable for other notes, for the same total principal amount and for the same terms but in different authorized denominations in accordance with the Indenture. Holders may present notes for registration of transfer at the office of the security registrar or any transfer agent Issuer designates. The security registrar or transfer agent may effect the transfer or exchange when it is satisfied with the documents of title and identity of the person making the request.

Issuer may appoint the trustee as security registrar for the notes. Issuer may at any time rescind that designation or approve a change in the location through which any registrar acts. Issuer may be required to maintain an office or agency for transfers and exchanges in each place of payment. Issuer may at any time designate additional registrars for the notes.

In the case of any redemption, the security registrar may not necessarily be required to register the transfer or exchange of any notes either: a) during a period beginning 15 business days prior to the mailing of the relevant notice of redemption and ending on the close of business on the day of mailing of the notice; or b) if the notes have been called for redemption in whole or in part, except the unredeemed portion of any notes being redeemed in part.

Payment and Paying Agents According to the General Embodiment

Payments on the notes may be made in U.S. dollars at the office of the trustee. At Issuer's option, however, Issuer may make payments by check mailed to the holder's registered address or, with respect to global notes, by wire transfer. Issuer may make interest payments to the person in whose name the note is registered at the close of business on the record date for the interest payment.

The trustee may be designated as Issuer's paying agent for payments on notes. Issuer may at any time designate additional paying agents or rescind the designation of any paying agent or approve a change in the office through which any paying agent acts.

Subject to the requirements of any applicable abandoned property laws, the trustee and paying agent may pay to Issuer upon written request any money held by them for payments on the notes that remain unclaimed for two years after the date upon which that payment has become due. After payment to Issuer, holders entitled to the money may have to look to Issuer for payment. In that case, all liability of the trustee or paying agent with respect to that money may cease.

Notices According to the General Embodiment

Except as otherwise described herein, notice to registered holders of the notes may be given by mail to the addresses as they appear in the security register. Notices may be deemed to have been given on the date of such mailing.

Replacement of Notes According to the General Embodiment

Issuer may replace any notes that become mutilated, destroyed, stolen, or lost at the expense of the holder upon delivery to the trustee of the mutilated notes or evidence of the loss, theft or destruction satisfactory to Issuer and the trustee. In the case of a lost, stolen or destroyed notes, indemnity satisfactory to the trustee and Issuer may be required at the expense of the holder of the note before a replacement note will be issued.

Payment of Stamp and Other Taxes According to the General Embodiment

Issuer may pay stamp and other duties, if any, which may be imposed by the United States or any political subdivision thereof or taxing authority thereof or therein with respect to the issuance of the notes. Issuer may not necessarily be required to make any payment with respect to any other tax, assessment or governmental charge imposed by any government or any political subdivision thereof or taxing authority thereof or therein.

Book Entry System According to the General Embodiment

The notes may be represented by one or more global securities (each a "Global Security"). Each Global Security may be deposited with, or on behalf of, the Depository Trust Company ("DTC") and be registered in the name of a nominee of DTC. Except under circumstances described below, the notes may not necessarily be issued in definitive form.

Upon the issuance of a Global Security, DTC may credit on its book-entry registration and transfer system the accounts of persons designated by the underwriter with the respective principal amounts of the notes represented by the Global Security. Ownership of beneficial interests in a Global Security may be limited to persons that have accounts with DTC or its nominee ("participants") or persons that may hold interests through participants. Ownership of beneficial interests in a Global Security may be shown on, and the transfer of that ownership may be effected through, records maintained by DTC or its nominee (with respect to interests of persons other than participants). It is noted that the laws of some states may require that some purchasers of securities take physical delivery of the securities in definitive form. Such limits and such laws may impair the ability to transfer beneficial interests in a Global Security.

So long as DTC or its nominee is the registered owner of a Global Security, DTC or its nominee, as the case may be, may be considered the sole owner or holder of the notes represented by that Global Security for all purposes under the Indenture. Except as provided below, owners of beneficial interests in a Global Security may not necessarily be entitled to have notes represented by that Global Security registered in their names, may not receive or be entitled to receive physical delivery of notes in definitive form and may not be considered the owners or holders thereof under the Indenture. Principal and interest payments, if any, on notes registered in the name of DTC or its nominee may be made to DTC or its nominee, as the case may be, as the registered owner of the relevant Global Security. Neither Issuer, Support Company, the trustee, any paying agent, or the registrar for the notes may necessarily have any responsibility or liability for any aspect of the records relating to nor payments made on account of beneficial interests in a Global Security or for maintaining, supervising or reviewing any records relating to such beneficial interests.

It is expected that DTC or its nominee, upon receipt of any payment of principal or interest, if any, may credit essentially immediately participants' accounts with payments in amounts proportionate to their respective beneficial interests in the principal amount of the relevant Global Security as shown on the records of DTC or its nominee. It is also expected that payments by participants to owners of beneficial interests in a Global Security held through these participants may be governed by standing instructions and customary practices, as is the case with securities held for the accounts of customers in bearer form or registered in "street name", and may be the responsibility of the participants.

If DTC is at any time unwilling or unable to continue as a depositary and a successor depositary is not appointed by Issuer within 90 days, Issuer may issue notes in definitive form in exchange for the entire Global Security for the notes. In addition, Issuer may at any time and in its sole discretion determine not to have notes represented by a Global Security and, in such event, may issue notes in definitive form in exchange for the entire Global Security relating to the notes. In any such instance, an owner of a beneficial interest in a Global Security may be entitled to physical delivery in definitive form of notes represented by the Global Security equal in principal amount to the beneficial interest and to have the notes registered in its name. Notes so issued in definitive form may be issued as registered notes in denominations of $1,000 and multiples thereof, unless otherwise specified by Issuer.

Plan of Distribution According to the General Embodiment

The underwriters may enter into a purchase agreement Issuer and Support Company with respect to the notes. Subject to certain conditions, each underwriter may severally agree to purchase the notes in a desired aggregate principal amount at maturity.

The purchase price to the underwriters for the notes may be an initial offering price less an underwriting discount. The underwriters may initially offer the notes at the initial offering price. After the notes are released for sale, the initial purchasers may change the offering price and other selling terms.

Issuer and Support Company may grant the underwriters an option (e.g., for 30 days) to purchase additional notes (e.g., up to approximately an additional $800 million aggregate principal amount at maturity), at the initial offering price (less underwriting discount).

The notes and the common stock of Support Company issuable upon conversion of the notes may not necessarily have been registered under the Securities Act. Each underwriter may agree that it will only offer or sell the notes in the United States to qualified institutional buyers in reliance on Rule 144A under the Securities Act.

The notes may be a new issue of securities with no established trading market. The underwriters may make a market in the notes but may not necessarily be obligated to do so and may discontinue market making at any time without notice. The liquidity of a trading market for the notes may not necessarily be assured.

In connection with the offering, the underwriters may purchase and sell notes and common stock of Support Company in the open market. These transactions may include short sales, stabilizing transactions and purchases to cover positions created by short sales. Short sales may involve the sale by the underwriters of a greater principal amount of notes than they may be required to purchase in the offering. Stabilizing transactions may consist of certain bids or purchases made for the purpose of preventing or retarding a decline in the market price of the notes while the offering is in progress.

The underwriters may impose a penalty bid. This may occur when a underwriter repays to the underwriters a portion of the underwriting discount received by it because the underwriters have repurchased notes sold by or for the account of such underwriter in stabilizing or short covering transactions.

These activities by the underwriters may stabilize, maintain or otherwise affect the market price of the notes and common stock of Support Company. As a result, the price of the notes and common stock of Support Company may be higher than the price that otherwise might exist in the open market. If these activities are commenced, they may be discontinued by the underwriters at any time. These transactions may be effected in the over-the-counter market or otherwise.

Support Company may agree, subject to certain exceptions, during the period beginning on the date of the initial offering of the notes and continuing until the date 90 days after the date of this the initial offering of the notes, not to directly or indirectly offer, sell, contract to sell, sell any option or contract to purchase, purchase any option or contract to sell, grant any option right or warrant for the sale of, lend or otherwise dispose of any of the common stock of Support Company, any securities substantially similar to the common stock of Support Company, or any securities convertible, exchangeable or exercisable for the common stock of Support Company or substantially similar securities, or file any shelf registration statement under the Securities Act covering any offering of the common stock of Support Company, or enter into swaps or other agreements.

Issuer and Support Company may agree to indemnify the underwriters against certain liabilities, including liabilities under the Securities Act.

Issuer may not necessarily apply for listing of the notes on any securities exchange or for inclusion of the notes in any automated quotation system.

As described above, the present invention (e.g., as implemented in the inventive CARZ structure) may be a puttable convertible which may also have contingent conversion, contingent cash payment, and/or contingent accretion features. In addition, the present invention may comprise a zero coupon convertible and may be fixed or floating rate (e.g., fixed or floating rate over a given time period which may be shorter than a time period over which the obligation is outstanding). In one example (which example is intended to be illustrative and not restrictive), the put feature may allow investors to put the obligation for accreted value at a number of discrete dates (e.g., years 5, 7, 10, 15, etc.). Further, in another example (which example is intended to be illustrative and not restrictive), the obligation may be callable at any time after a date which either equals or comes after the first put date.

In another embodiment, a truncation feature may be provided which allows the issuer to truncate the maturity of the obligation (e.g., unilaterally at any time). For the purposes of the present application, the term "truncate a maturity date" is intended to refer to making the maturity date earlier in time than it would otherwise occur. In one example (which example is intended to be illustrative and not restrictive) the issuer may truncate the maturity to a date on or after a "first truncation date", which first truncation date may equal the second or subsequent date on which investors could put the obligation. In a further example (which example is intended to be illustrative and not restrictive) the first truncation date may be on or after a first call date. In another example (which example is intended to be illustrative and not restrictive) the truncation may form a commitment (e.g., a binding commitment) to call the obligation at the designated truncation date.

Of note, announcement of truncation may effectively give investors notice that, if they do not exercise their puts or convert by the truncation date, the issuer will exercise its call right. By so shortening the maturity, the issuer may effectively eliminate all the embedded puts that otherwise exist beyond the truncation date.

Of further note, truncation differs from exercise of a call in that the underlying obligation remains outstanding until the date of truncation (which may occur, for example, several months or years in the future). In this regard, prior to the truncation date the issuer may continue to realize beneficial accrual of tax deductions and, with a contingent conversion feature, maintain share count (assuming stock price is below the contingent conversion threshhold).

In addition, in embodiments where the issuer could have unilaterally called the obligation anyway (i.e., without the truncation feature), it is believed that investors will essentially not react negatively to the existence of such a truncation feature.

Moreover, it is believed that the truncation feature may substantially ameliorate potentially adverse accounting for puttable convertibles that may occur under the pending FASB Liabilities and Equity Project, without significantly impugning the contingent payment tax treatment. Thus, in one embodiment the issuer could choose to invoke truncation if at some future date adoption of the Liabilities and Equity Project becomes imminent, with adverse accounting for puttable convertibles.

Finally, under the Liabilities and Equity Project, it is believed that the issuer might be required to mark-to-market to embedded puts through its income statement. By eliminating the post-truncation puts, the issuer may dampen the mark-to-market impact of the Liabilities and Equity Project.

While a number of embodiments of the present invention have been described, it is understood that these embodiments are illustrative only, and not restrictive, and that many modifications may become apparent to those of ordinary skill in the art. For example, the present invention may be used with any desired issuer, and/or supporting company, and/or trustee, and/or underwriters(s). Further, while the present invention has been described with regard to particular calculation periods (e.g., quarterly and semi-annual calculation periods), any desired calculation periods (e.g., weekly, monthly, quarterly, semi-annually, or yearly) may be used (and the specific dates defining such calculation periods may be any desired dates). Further still, while the description of the general embodiment referred to the issuance of notes having a specific aggregate principal amount at maturity, any other desired notes having a different aggregate principal amount at maturity may of course be issued. Further still, while the description of the general embodiment referred to each of the notes as having a specific issue price and a specific nominal principal amount at maturity (i.e., denomination), any other desired issue price or nominal principal amount at maturity may of course be used. Further still, while the description of the general embodiment referred to each of the notes as having a specific maturity date, any other desired maturity date may of course be used. Further still, while the description of the general embodiment referred to each of the notes as being a senior unsecured obligation ranking equally with other unsecured and unsubordinated debt, the notes could alternatively be secured and could have a higher or lower ranking than other debt Further still, while the description of the general embodiment referred to each of the notes as having a specific yield to maturity (which is computed semi-annually on a bond-equivalent basis), any other desired yield may of course be used (and such yield may be computed at any desired period on any desired basis). Further still, while the description of, the general embodiment referred to each of the notes as having specific cash interest payment terms, any other desired cash payment terms may of course be used. Further still, while the description of the general embodiment referred to each of the notes as having specific interest adjustment terms, any other desired interest adjustment terms may of course be used. Further still, while the description of the general embodiment referred to specific tax event definitions and consequences, any other desired tax event terms may of course be used. Further still, while the description of the general embodiment referred to each of the notes as having specific conversion rights terms, any other desired conversion rights terms may of course be used. Further still, while the description of the general embodiment referred the notes as having specific terms relating to redemption of the notes at the option of the issuer, any other desired terms relating to redemption of the notes at the option of the issuer may of course be used. Further still, while the description of the general embodiment referred to the notes as having specific terms relating to repurchase of the notes at the option of the holder, any other desired terms relating to repurchase of the notes at the option of the holder may of course be used. Further still, while the description of the general embodiment referred the to notes as having specific terms relating to change in control of the issuer, any other desired terms relating to change in control of the issuer may of course be used. Further still, while the description of the general embodiment referred to the notes as having specific terms relating to default, any other desired terms relating to default may of course be used. Further still, while the description of the general embodiment referred to the notes as having specific terms relating to registration rights, any other desired terms relating to registration rights may of course be used. Further still, while the description of the general embodiment referred to specific tax issues, any other desired terms or interpretations relating to tax issues may of course be used. Further still, while the description of the general embodiment referred to specific book-entry terms, any other desired terms relating to book-entry issues may of course be used. Further still, the Indenture and/or the notes may be governed by, and construed in accordance with, any appropriate Federal and/or state law (e.g., New York state law). Further still, any desired trustee and/or registrar and/or paying agent may be used. Further still, the notes (which may be available only in book-entry form) may be issued in the form of one or more global securities bearing various disclaimer and/or disclosure legends. Further, the issuer may or may not apply for listing of the notes on any securities exchange or for inclusion of the notes in any automated quotation system. Further still, the current yield may be set essentially instantaneously or continuously on a real-time or quasi real-time basis. Further still, proceeds from the issuance of the notes may be used as desired by the issuer (including, but not limited to, use for general corporate purposes). Further still, the invention may be utilized in connection with any desired type of transaction (s). Further still, the invention may be securitized as desired (e.g., the obligation may be sold in the form of one or more securities). Further still, the obligation (e.g., in the form of one or more securities) may be issued, and/or sold, and/or re-sold in any desired public market and/or private market (e.g., a primary market and/or a secondary market). Further still, the obligation (e.g., in the form of one or more securities) may be issued, and/or sold, and/or re-sold in or on any desired exchange.

What is claimed is:

1. A computer-automated method for conducting a transaction, comprising:
setting a maturity date for an obligation issued by an issuer via a computer-automated system;
setting an initial yield for the obligation, wherein the initial yield is applied to the obligation for an initial time period;

setting a current yield for the obligation equivalent to one of a first reset yield and a second reset yield, depending upon a value of a share of a stock in relation to an accreted conversion price of the obligation;

applying the current yield to the obligation after the initial time period has elapsed;

converting the obligation into the stock according to a conversion formula;

permitting the issuer to truncate the maturity date; and making at least one payment based on the current yield;

wherein the current yield is set essentially continuously on a real-time basis.

2. The method of claim 1, wherein the first reset yield equals a rate that would result in a trading price of par of a hypothetical issue of a debt security of a reset rate target entity, wherein the terms of the hypothetical issue of the debt security include: (i) a predetermined maturity; and (ii) an aggregate principal amount substantially equal to an accreted principal amount of the obligation.

3. The method of claim 1, wherein each of the initial time period, the initial yield, the first reset yield, and the second reset yield equals a value selected from the group consisting of: a) a value set by the time of issuance of the obligation; and b) a value set after the time of issuance of the obligation.

4. The method of claim 1, wherein at least one of the initial time period, the initial yield, the first reset yield, and the second reset yield has at least one of an upper limit and a lower limit.

5. The method of claim 1, wherein at least one of the initial time period, the initial yield, the first reset yield, and the second reset yield has a value which depends upon a sliding scale.

6. The method of claim 5, wherein the sliding scale is set by the time of the issuance of the obligation.

7. The method of claim 5, wherein the sliding scale changes over time.

8. The method of claim 1, wherein the second reset yield equals the initial yield.

9. The method of claim 1, further comprising setting at least one of an issue price and a nominal maturity value for the obligation.

10. A computer-automated method for conducting a transaction, comprising:

setting a maturity date for an obligation issued by an issuer via a computer-automated system;

setting an initial accretion rate for the obligation, wherein the initial accretion rate is applied to the obligation for an initial time period;

setting a current accretion for the obligation equivalent to one of a first reset accretion rate and a second reset accretion rate, depending upon a value of a share of a stock in relation to an accreted conversion price of the obligation;

applying the current accretion to the obligation after the initial time period has elapsed;

converting the obligation into the stock according to a conversion formula;

permitting the issuer to redeem the obligation according to a redemption formula;

permitting a holder of the obligation to require the issuer to re-purchase the obligation according to a re-purchase formula;

permitting the issuer to truncate the maturity date; and making at least one payment based on the current accretion rate;

wherein the current accretion rate is set essentially continuously on a real-time basis.

11. The method of claim 10, further comprising setting at least one of an issue price and a nominal maturity value for the obligation.

12. A computer-automated method for conducting a transaction, comprising:

setting a maturity date for an obligation issued by an issuer via a computer-automated system;

setting an initial yield for the obligation, wherein the initial yield is applied to the obligation for an initial time period;

setting a current yield for the obligation equivalent to one of a first reset yield and a second reset yield, depending upon a value of a share of a stock in relation to an accreted conversion price of the obligation;

applying the current yield to the obligation after the initial time period has elapsed;

converting the obligation into the stock according to a conversion formula;

permitting the issuer to truncate the maturity date; and making at least one payment based on the current yield;

wherein the current yield is set essentially continuously on a real-time basis;

wherein at least one of the initial time period, the initial yield, the first reset yield, and the second reset yield has a value which depends upon a sliding scale.

* * * * *